June 10, 1941.  E. L. BENEDICT  2,244,670
COOKING AND VENDING MACHINE
Filed Oct. 30, 1939  2 Sheets-Sheet 1

INVENTOR
EDWARD L. BENEDICT.
BY Ostrolenk & Greene
ATTORNEYS

June 10, 1941. E. L. BENEDICT 2,244,670
COOKING AND VENDING MACHINE
Filed Oct. 30, 1939 2 Sheets-Sheet 2
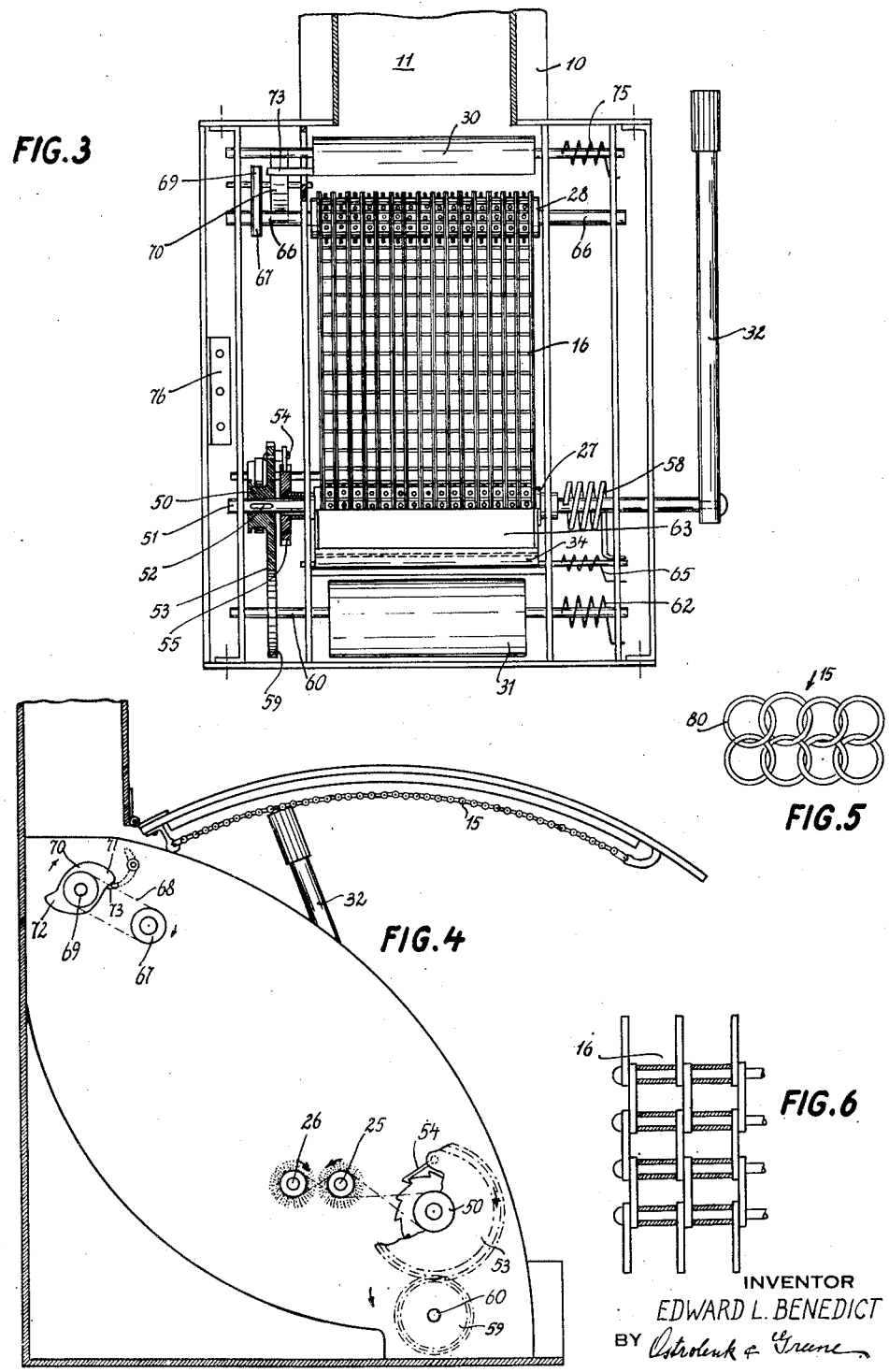
INVENTOR
EDWARD L. BENEDICT
BY Ostrolenk & Greene
ATTORNEYS Patented June 10, 1941

2,244,670

UNITED STATES PATENT OFFICE 2,244,670

COOKING AND VENDING MACHINE

Edward L. Benedict, New York, N. Y.

Application October 30, 1939, Serial No. 301,878

19 Claims. (Cl. 53—5)

My invention relates to a dispensing device for cylindrical objects and more specifically it relates to a dispensing device for frankfurters in which the frankfurters are cooked and dispensed simultaneously with heated rolls.

The need for sanitary dispensing devices for food products is well known throughout the art. Although certain machines have been devised for automatically cooking frankfurters they have been impractical from the standpoint of operation and cost. A typical machine is represented by the patent to Zerr, No. 2,142,390, in which the frankfurters are placed upon spits by the operators and the said spits placed in a certain conveying mechanism which by a gear operation rotates the spits and hence the frankfurters and exposes them to the flame.

It is obvious, however, that the operation of spitting the frankfurters is rather dangerous in the course of hasty handling by semi-skilled operators and further the spitting operation causes a penetration and loss of juice of the frankfurter. Because of the necessity for the spitting operation the time consumed makes the operation of this device impractical.

I have devised a novel apparatus for the simultaneous dispensing of cooked frankfurters and heated rolls. My machine is distinguished by the fact that the frankfurters are cooked while travelling between a stationary or movable flexible pad which presses down against the frankfurters that are on a travelling belt. The travelling belt rotates the frankfurters against the stationary flexible pad and causes them to be moved down toward the dispensing end of the machine.

My dispensing machine may be coin operated and suitable coin release means are well known in the art per se. The actuation of the machine is effected by means, for example, of a lever which is in direct connection with a sprocket which moves the conveyor belt. Actuation of the lever energizes electrical heating elements disposed adjacent the path of the frankfurters and these elements are heated for a suitable period of time after the actuation of the lever to effect the gradual cooking of the frankfurter. Heating means are provided for maintaining the frankfurter, which is next to be dispensed, warm. As will be set forth more specifically hereinafter, I also provide means for cleaning the conveying belt as well as means for cleaning the griddle which is heated by the electrical heating elements. The frankfurters do not come in direct contact with the griddle at any time but are carried between the travelling belt and stationary flexible pad.

The frankfurters are automatically fed into the cooking apparatus and dispensed therefrom by the actuation of the lever arm. It is a feature of my invention that the apparatus is sealed against all dust and dirt and has a high sanitary value. Water is provided for floating any excess fat which drips from the cooked frankfurters which water also provides a humid atmosphere for the cooking operation. The rolls which are the complement of the frankfurters are warmed by the indirect effect of the heat from the cooking elements and are dispensed simultaneously with the frankfurters.

It is the object of my invention to provide a novel sanitary dispensing device for cylindrical objects.

It is another object of my invention to provide a dispensing and cooking device for frankfurters and similar food products that is entirely automatic in its operation.

It is a further object of my invention to provide a novel apparatus in which frankfurters and rolls are dispensed in suitable magazines and the frankfurters cooked while being conveyed and rotated between a stationary or movable flexible and a travelling conveyor belt.

It is a further object of my invention to provide a frankfurter cooking and dispensing apparatus in which a drip pan is provided beneath the frankfurters being cooked with water in said drip pan for providing a humid atmosphere for said cooking operation and for floating the grease.

It is a further object of my invention to provide in a frankfurter cooking and dispensing machine in which the frankfurters are conveyed on a travelling belt and cooked over a griddle during their travel, brush means for cleaning said travelling belt and scraper means carried by said travelling belt for cleaning said griddle.

It is a further object of my invention to provide a novel means for automatically introducing frankfurters into said cooking and dispensing machine and also automatic means for dispensing said cooked frankfurters and heated rolls simultaneously upon actuation of said machine.

It is a further object of my invention to provide a means for progressively cooking frankfurters and maintaining said frankfurters constantly in readiness for serving.

It is a further object of my invention to provide a machine which is sealed against dirt and dust so as to provide completely sanitary cooking conditions.

These and other objects of my invention will be apparent from a consideration of the drawings now set forth in detail.

Figure 3 represents a front view of the apparatus of my invention with the front cover removed.

Figure 4 represents a side elevation of the apparatus of my invention showing the side opposite to that shown in Figure 2.

Figure 5 represents a detail showing of the stationary flexible pad of my apparatus.

Figure 6 represents a detail showing of the travelling conveyor belt of my device.

Figure 1:
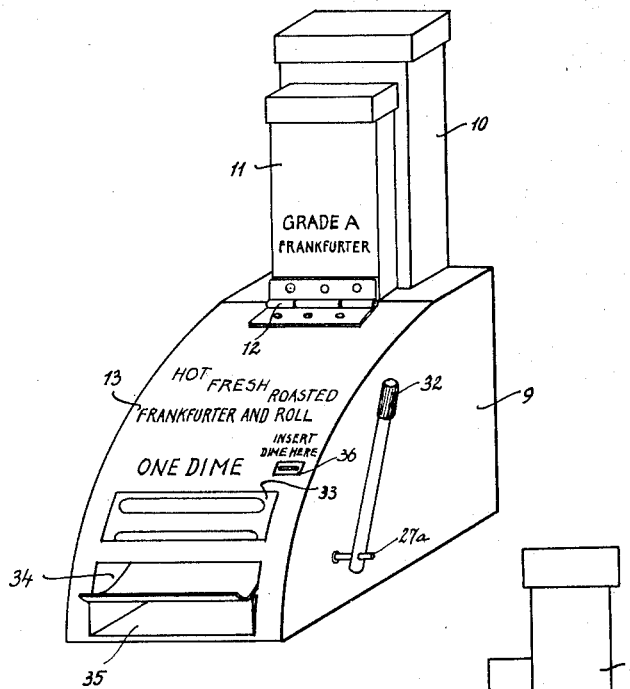
Figure 1 represents a perspective view of the frankfurter dispensing and cooking apparatus of invention.
Figure 2:
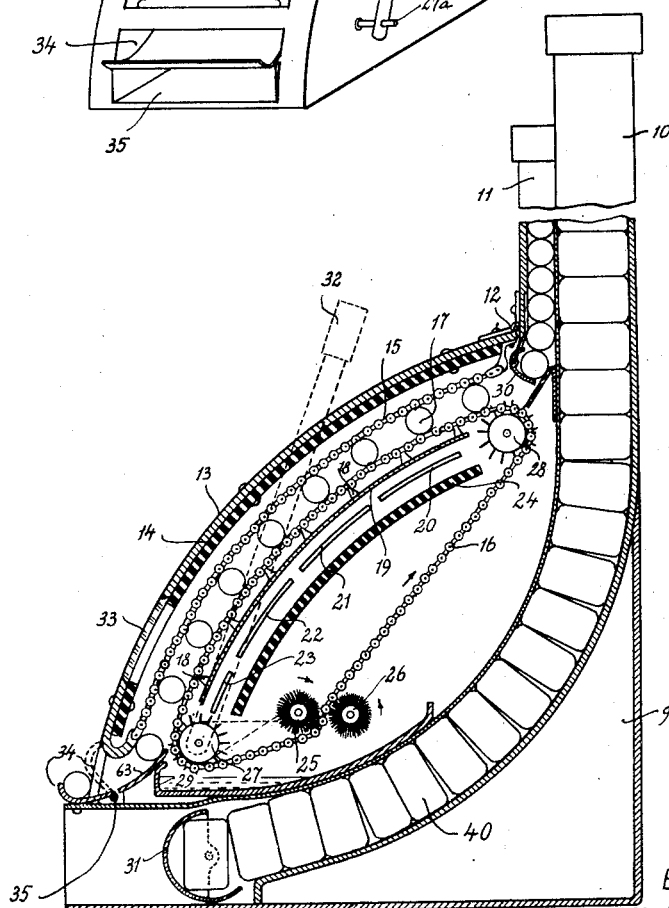
Figure 2 represents a side elevation of the apparatus of my invention with the side cover removed.

Referring now more specifically to the drawings, in Figures 1 and 2, I show as the respective parts of my cooking and dispensing device a magazine 10 in which rolls are disposed and a magazine 11 in which the frankfurters are disposed. Although I may rely on the force of gravity for bringing the rolls and frankfurters to my dispensing apparatus I may provide an extra weight or pressure to be superimposed on said rolls and frankfurters to cause them to be moved through the magazine. I provide suitable closure caps for said frankfurter and said roll magazines.

By means of the hinge 12 a front cover 13 is provided for my apparatus. Beneath the cover 13 is a layer of insulating material 14 which is adapted to retain the heat within the apparatus. Beneath the cover 13 is suspended a stationary or movable flexible pad 15 which loosely bears down against the frankfurters 17 and maintains them against the travelling conveyor belt 16. The flexible pad 15 is flexible in all directions and may be composed of ring-like elements such as is shown more specifically in Figure 5. The flexible pad 15 and the conveyor belt 16 are substantially wider than the frankfurters 17. Beneath the conveyor belt 16 is a griddle 19 which is cleaned by the scrapers 18 carried on the conveyor belt 16. The griddle 19 is heated by the heating elements 20, 21, 22 and 23. An insulating plate 24 confines and reflects the heat from the heating elements on to the griddle and back into the cooking area.

The belt 16 is cleaned by the brushes 25 and 26 which scrub the chain 16 as it passes therebetween during its path of travel over the sprockets 27 and 28. A drip pan 29 adapted to carry water is provided to receive the drippings from the cooking frankfurters and to humidify the cooking atmosphere.

A butterfly 30 introduces frankfurters one at a time as required into the cooking chamber where they are carried between the flexible pad 15 and the conveyor belt 16. A cup member 31 which is actuated simultaneously with the other mechanisms of my apparatus by the control arm 32 attached at 27a to the axle 27 of the sprocket dispenses the rolls 40 which are warmed by the heat from the electric elements 20, 21, 22 and 23. A window 33 is provided in the front cover 13 for display or advertising purposes.

At the dispensing end I provide a curved member 34 hinged at 35 for dispensing the frankfurters. This curved element is normally maintained by spring or gravity action in the closed position shown in dotted line. When a frankfurter is dispensed from the machine upon operation of the arm 32 the frankfurter causes the cup member 34 to fall to the position indicated in the solid line in Figure 2.

In Figures 3 and 4 I show the means employed for operating the butterfly 30 which introduces the frankfurters into the cooking mechanism and also the dispensing mechanism for dispensing the frankfurters and the rolls. Thus I show a disc member 50 mounted on the shaft 51 of the sprocket 27. The disc member is keyed at 52 to the shaft 51. The disc 50 carries rigidly affixed thereto a gear member 53 and a catch 54. The catch member 54 engages a ratchet 55 which is freely mounted on the shaft 51 but fixed to the sprocket member 27.

Upon moving of the lever arm 32 towards the front of the machine the conveyor belt 16 is actuated by the sprocket 27 through the ratchet 55 and the catch 54 which is carried on the disc 50 to carry the frankfurters down the cooking path.

The lever arm 32 operates against the action of the spring 58 and rotates the disc 50 fixed on the shaft 51 which carries with it the gear 53 and the catch 54. The gear 53 engages and rotates the coacting gear 59 fixedly mounted on the shaft 60 which operates the roll dispensing device 31.

On release of the lever arm the direction of movement of the shaft 51 is reversed and the gear 53 moves in the opposite direction returning the gear 59 to its original position, and thus in turn returning the roll dispenser 31 to its original position. This movement is furthered by the action of the spring 62. The frankfurter received from between the stationary pad 15 and the conveyor belt 16 travels over the member 63 on to the cup member 34 which is normally held up by the spring 65 and which is depressed by the weight of the frankfurter and falls to the dispensing position.

The movement of the travelling belt 16 also moves the sprocket 28 which is mounted on the shaft 66. Fixed on the shaft 66 is a disc 67 about which rotates a belt or chain 68 which revolves disc 69 adjacent which is mounted a cam 70 with the raised portions 71 and 72 to strike the extending arm 73 of the butterfly member 30 which thereupon causes a frankfurter to be delivered to the cooking device and holding the frankfurters in magazine 11 in a fixed position to be placed on belt 16 by the next rotation of the cam.

When the raised portion 71 of the cam 70 passes this arm the butterfly member 30 is returned to its normal position by the spring 75.

In Figure 3 I show a hinge 76 which coacts with a hinge on the side of the dispensing device so that the side may be completely opened for removal of parts or cleaning.

In Figure 5 I show a detail of the stationary flexible pad member 15 which it will be noted is composed of rings 80 which are joined together to form the flexible pad member. By reason of this ring construction the pad is flexible in all directions.

It should be noted that, while the pad 15 has been described as stationary, it may, where desired, be a movable one mounted on appropriate sprockets geared to or operated by the sprockets of the belt 16 or by the lever arm 32 in any suitable manner. Where it is movable, then it may be arranged to move either in a direction opposite to that of belt 16 or in the same direction, but in either case at a slower speed than said belt so that the component of moving forces on the frankfurters will be in the proper direction. The yielding pressure on the frankfurter as it passes between belt 16 and pad 15 serves to rotate it thus exposing all sides thereof evenly to the heat. A countermotion by the pad 15 (when it too comprises a moving belt as above noted) will serve to increase the rotation and assure an even cooking, while even a motion in the same direction but at a slower speed will also produce such rotation.

While the rolls 40 are shown as moved by gravity, suitable movable belts or rollers may be provided therefor particularly toward the bottom of their path. Similarly, suitable movable rollers in addition to belt 16 may be provided particularly toward the end of the path of travel of the frankfurters to ensure ejection and dispensing thereof.

In Figure 6 I show the conveyor belt 16.

I should like to emphasize the following desirable features of the apparatus of my invention. First, I have provided a complete normally sealed device for storing, cooking and dispensing frankfurters and storing, heating and dispensing rolls. The frankfurters and rolls need not be touched by human hand from the time of manufacture to delivery to the consumer. Both the stored goods and the cooked and heated goods are treated entirely automatically and no manual operations are required except for the actuation of the dispensing device.

My device provides for a simultaneous dispensing of cooked frankfurters and rolls, but it is to be understood that the rolls may be warmed and delivered in any manner and my invention carried within its scope as an apparatus for cooking and dispensing frankfurters alone.

A particular feature of importance of my frankfurter cooking device is the means I have provided for handling of cylindrical objects such as frankfurters. My means comprises the stationary or movable flexible pad which presses the frankfurters against a flexible belt which is moved by the actuation of the dispensing control. The largest problem in devices of this kind is to provide for the uniform handling of irregular objects. Frankfurters, of course, are generally irregularly curved cylinders. I have found that the stationary pad and travelling belt I employ are most suitable for conveying and rotating these irregular frankfurters.

It is a further feature of my invention that I provide means for delivering frankfurters to the conveying and cooking mechanism which spaces the frankfurters a proper distance apart. As seen in the drawing of Figure 2, there are nine frankfurters in progress through the machine. When the lever 32 is actuated after being released by deposit of a coin, it rotates the sprocket 27 which drives the chain 16 and moves the frankfurters a distance equal to the space between each frankfurter. At the same time a fresh frankfurter is delivered by the butterfly member 30 to the mechanism. Simultaneously the heating elements 20, 21, 22 and 23 are turned on and remain heated for a short period of time. The time of heating is controlled by a suitable time clock mechanism thermostat or other suitable timing mechanism. After a short period of time these heating elements are turned off so that the cooking is effected in stages as the device is operated. Since the heat is, therefore, turned on nine times, the frankfurter is heated in nine stages during its travel. The period of time during which the heating elements are turned on is carefully adjusted so that the sum total of the nine stages of heating is exactly right for the proper cooking of the frankfurter.

It is to be understood that various mechanical equivalents of the devices as shown may be employed for delivering the frankfurters to the conveying and cooking mechanism and for dispensing the frankfurters and rolls therefrom. Further, various methods of cleaning and scrapping the travelling belt and griddle may be employed.

As I have shown the entire device should be insulated both to preserve the heat generated therein and also to insure the proper heating of the rolls stored in the apparatus.

A suitable vent may be provided if it is further desirable to remove the cooking vapors or excess heat from the machine.

While in the foregoing I have referred principally to frankfurters, my invention may apply as readily to any cylindrical or even spherical foods including sausages, rolls and other foods which may be rolled.

It is to be understood that I have set forth my invention in a form of apparatus by way of specific example and that various modifications of that apparatus may be made within the spirit of my invention. I intend, therefore, to be limited only by the claims hereto appended.

I claim:

1. A dispensing device for cooking and dispensing frankfurters and simultaneously dispensing rolls which comprises a magazine for frankfurters and a magazine for rolls, means for cooking said frankfurters, means for heating rolls and means for simultaneously dispensing said cooked frankfurters and heated rolls.

2. A dispensing and cooking device for frankfurters which comprises means for conveying and rotating said frankfurters comprising a stationary flexible pad and a travelling belt.

3. A dispensing and cooking device for frankfurters which comprises means for conveying and rotating said frankfurters comprising a stationary flexible pad and a travelling belt, both said pad and said belt being of greater width than said frankfurter.

4. A dispensing and cooking device for frankfurters which comprises means for conveying and rotating said frankfurters comprising a stationary flexible pad and a travelling belt, both said pad and said belt being of greater width than said frankfurter, means for delivering said frankfurters to said means for conveying and rotating said frankfurters and means for cooking said frankfurters comprising a griddle and means for heating the griddle.

5. A dispensing and cooking device for frankfurters which comprises means for conveying and rotating said frankfurters comprising a stationary flexible pad and a travelling belt, both said pad and said belt being of greater width than said frankfurter, means for cooking said frankfurters, a receptacle below said frankfurters for holding water to humidify the atmosphere and for receiving the drippings from said frankfurters.

6. A dispensing and cooking device for frankfurters which comprises means for conveying and rotating said frankfurters comprising a stationary flexible pad and a travelling belt, both said pad and said belt being of greater width than said frankfurter, means for cooking said frankfurters comprising a griddle, cleaning means carried by said travelling belt for cleaning said griddle.

7. A dispensing and cooking device for frankfurters which comprises means for conveying and rotating said frankfurters comprising a stationary flexible pad and a travelling belt, both said pad and said belt being of greater width than said frankfurter, means for cooking said frankfurters comprising a griddle, scrapers carried by said travelling belt for cleaning said griddle.

8. A dispensing and cooking device for frankfurters which comprises means for conveying and rotating said frankfurters comprising a movable flexible pad and a travelling belt said flexible pad being movable at a slower speed than said belt, both said pad and said belt being of greater width than said frankfurter, means for cooking said frankfurters comprising a griddle, means for cleaning said travelling belt.

9. A dispensing and cooking device for frankfurters which comprises means for conveying and rotating said frankfurters comprising a stationary flexible pad and a traveling belt, both said pad and said belt being of greater width than said frankfurter, means for cooking said frankfurters comprising a griddle, means for cleaning said travelling belt comprising brushes.

10. A dispensing and cooking device for frankfurters which comprises means for conveying and rotating said frankfurters comprising a travelling belt and a flexible pad movable at a slower speed than said belt and in a direction opposite thereto, both said pad and said belt being of greater width than said frankfurters, means for cooking said frankfurters comprising separate electrical heating means, said heating means being periodically actuated.

11. A dispensing and cooking device for frankfurters which comprises means for conveying and rotating said frankfurters comprising a travelling belt and a flexible pad movable at a slower speed than said belt and in the same direction, both said pad and said belt being of greater width than said frankfurter, means for cooking said frankfurters comprising separate electrical heating means, said heating means being periodically actuated, an insulated shield behind said heating elements.

12. A dispensing and cooking device for frankfurters which comprises means for conveying and rotating said frankfurters comprising a movable flexible pad and a travelling belt said flexible pad travelling at a slower speed than said belt, both said pad and said belt being of gerater width than said frankfurter, means for cooking said frankfurters, a normally closed dispenser for said cooked frankfurters.

13. A dispensing and cooking device for frankfurters which comprises means for conveying and rotating said frankfurters comprising a stationary flexible pad and a travelling belt, both said pad and said belt being of greater width than said frankfurters, means for cooking said frankfurters, a normally closed dispenser for said cooked frankfurters, said frankfurter dispenser being opened by the weight of the frankfurter delivered thereto.

14. A dispensing and cooking device for frankfurters which comprises means for conveying and rotating said frankfurters comprising a travelling flexible pad and a travelling belt, both said pad and said belt being of greater width than said frankfurters, means for cooking said frankfurters, means for actuating the device thereby delivering a frankfurter to the means for conveying and rotating said frankfurters and turning on the heating means and dispensing a frankfurter.

15. A dispensing and cooking device for frankfurters which comprises means for conveying and rotating said frankfurters comprising a stationary flexible pad and a travelling belt, both said pad and said belt being of greater width than said frankfurters, means for cooking said frankfurters, means for actuating the device thereby delivering a frankfurter to the means for conveying and rotating said frankfurters and turning on the heating means and dispensing a frankfurter and dispensing a roll.

16. A dispensing and cooking device for frankfurters which comprises a magazine for frankfurters and a magazine for rolls, means for conveying and rotating said frankfurters comprising stationary flexible metal pad and a travelling flexible metal belt, both said pad and said travelling belt being of greater width than said frankfurters, means for delivering said frankfurters to said means for conveying and rotating said frankfurters, means comprising a griddle for cooking said frankfurters, means for heating the griddle, a receptacle below said frankfurters for holding water to humidify the atmosphere and for receiving the drippings from said frankfurters, a dispenser for said cooked frankfurters and means for dispensing a roll upon actuation of the device.

17. A dispensing and cooking device for frankfurters which comprises a magazine for frankfurters and a magazine for rolls, means for conveying and rotating said frankfurters comprising stationary flexible metal pad and a travelling flexible metal belt, both said pad and said travelling belt being of greater width than said frankfurters, means for delivering said frankfurters individually to said means for conveying and rotating said frankfurters, means for cooking said frankfurters and catching the drippings therefrom comprising a griddle, means for heating the griddle; means for cleaning said griddle comprising scrapers carried by said travelling belt and means for cleaning said travelling belt comprising brushes.

18. A dispensing and cooking device for frankfurters which comprises means for cooking said frankfurters comprising separate electrical heating means, said heating means being periodically actuated, said heating means being alternately turned on and off so that the total period of heating of the frankfurters is sufficient to cook them as they travel through the device.

19. A dispensing and cooking device for frankfurters which comprises a magazine for frankfurters, means for conveying and rotating said frankfurters in spaced relation to each other and means for cooking said frankfurters, means for actuating the device, said means acting to move the frankfurters a certain distance and to apply heat to the frankfurters for a certain period of time, said frankfurters moving in spaced stages through said means for conveying and rotating said frankfurters, the total of heat applied being sufficient to cook properly said frankfurters over their path of travel in the device.

EDWARD L. BENEDICT.